May 27, 1930.  R. K. BONELL  1,759,933

CONTACT MAKING DEVICE

Filed March 2, 1928

INVENTOR
R. K. Bonell
BY
ATTORNEY

Patented May 27, 1930

1,759,933

UNITED STATES PATENT OFFICE

RALPH K. BONELL, OF EAST ORANGE, NEW JERSEY, ASSIGNOR TO AMERICAN TELEPHONE AND TELEGRAPH COMPANY, A CORPORATION OF NEW YORK

CONTACT-MAKING DEVICE

Application filed March 2, 1928. Serial No. 258,638.

This invention relates to contact-making devices, and more particularly to devices of this character which are adapted to actuate regulating apparatus.

An object of the invention consists in the provision of a contact-making device for closing a circuit to give an alarm or actuate regulating apparatus when some quantity, such as current or voltage, varies beyond certain predetermined limits.

Another object consists in the provision of a device of this character which will establish a firm electrical connection with its contacts in an effective, positive and reliable manner.

A further object consists in providing a simple and inexpensive contact-making device.

These and further objects will be apparent from the following description, when considered in connection with the accompanying drawing in which certain modifications of the invention are illustrated.

Figure 1:
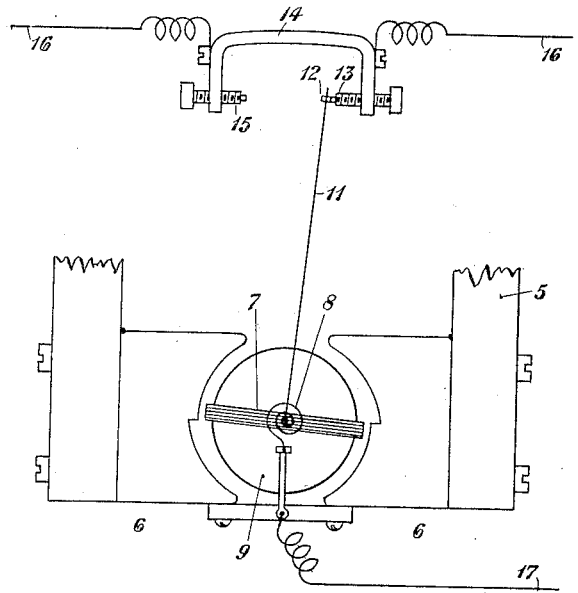
Figure 2:
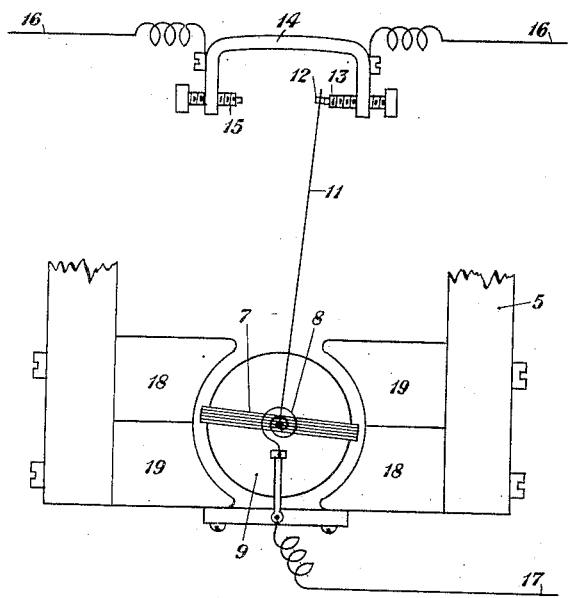

Referring to the drawing, Figure 1 illustrates one embodiment of the invention showing such essential portions of the improved device as are necessary for an understanding of the invention; and Fig. 2 is a modification of the embodiment shown in Fig. 1.

The contact-making devices at present employed have practically the same construction as the standard direct-current measuring instruments of the Weston type. This construction includes a permanent magnet of horseshoe shape to which are attached soft iron pole pieces so shaped as to produce a practically uniform magnetic field in the space between these pole pieces and a soft iron cylinder. In this uniform field there is a coil carrying the current to be measured which is capable of being rotated against the restoring torque of a spiral spring. With this type of construction, the torque tending to move the coil is proportional to the strength of the constant magnetic field and to the current in the coil.

A spiral spring of the sort used develops a restoring torque proportional to the angular deflection of the moving coil, and hence the deflection of the pointer across the scale will be directly proportional to the current in the coil. For a measuring instrument, this property is a useful one, since it produces a scale having equal divisions for equal increments of current. When such an instrument is used as a contact-making device, however, a uniform movement of the pointer carrying the contacts is a disadvantage for the reason that the movable contact carried by the pointer approaches the stationary contact very gradually and the exact point at which a firm electrical contact is made is indeterminate.

The pressure necessary to establish this contact varies with the condition of the surface of the contact metal. Consequently, while a good contact may be made at the predetermined voltage with considerable regularity when the instrument is new, if the contact points become tarnished or dirty to any extent, the behaviour becomes erratic.

In the improved device, there is substituted for the gradually made contact above described a light blow after the voltage or other quantity being measured has passed a predetermined point.

In Fig. 1 of the drawing, the permanent magnet is designated by the numeral 5, and soft iron pole pieces 6 are suitably attached thereto. The pole pieces 6 are of irregular shape and have a moving coil 7 of well known character positioned between them. A spring 8 is provided for the coil 7 to supply a restoring torque therefor. A soft iron cylinder 9 is provided to concentrate the magnetic flux, and may be similar to that used in ordinary measuring instruments. The air gap or distance between the pole pieces 6 and the cylinder 9 is not uniform, and consequently a greater flux density will be obtained where this distance is small than in places where it is greater. It is this difference in flux density which is used to produce the desired irregular rotation of the moving coil 7. A sudden change in the strength of the magnetic field as the coil rotates will produce a sudden change in torque acting on the coil 7. With the construction shown in Fig. 1 if the distribution of flux were such that an abrupt change in the strength of the magnetic field occurred at the point where the width of the gap changed, the pointer 11 would rest at all times against one or the other of the stops 13 or 15. However, since the change in flux would probably be more or less gradual from the stronger to the weaker condition for the purposes of explanation, it is assumed that at some point the total flux cut by the coil 7 changes very little as the coil rotates, and that hence it is possible for the pointer 11 to assume a stable middle position at times. Assuming this condition with the pointer or reed 11 in the position corresponding to the middle of the scale, the moving coil 7 is in the position where the magnetic flux has a mean value. If the current in said coil is supposed to increase, this will tend to produce rotation in a clock-wise direction. After rotating through a certain small angle, the coil 7 enters a region of increased flux density and the torque which tends to produce rotation will be suddenly increased without any increase in current in the coil. This sudden increase will tend to produce an accelerated rotation of the coil 7 and the pointer 11 carrying the moving contact 12 will be thrown against the right hand stationary contact 13. This sudden acceleration of the pointer 11 is counted on to cause the moving contact 12 to strike the stationary contact 13 a blow which is sufficient to establish a firm electrical connection and one which is not dependent within limits on the state of cleanliness of the surfaces of the contacts. A bracket 14, which may be suitably attached to the improved arrangement, carries the right hand stationary contact 13 and also an opposite contact of the same character which is designated by the character 15.

If, with the pointer in its normal balanced or middle position, the current through the moving coil 7 decreases slightly, a point will be reached where the flux density suddenly decreases. Without any further decrease in current through the coil this sudden decrease in flux density decreases the torque tending to turn the coil in a clockwise direction, and hence the restoring torque of the spiral spring 8 will more than balance this torque and the moving pointer 11 will be accelerated to the left. The moving contact 12 will strike the left hand stationary contact 15 a sudden blow in the same way as the right hand contact was struck with an increase in current.

In the modification indicated in Fig. 2, the construction is similar to that shown in Fig. 1. In Fig. 2, however, the pole pieces are made of two dissimilar metals having different permeabilities. For example, the portions 18 have a higher permeability than the portions 19. The provision of the pole pieces 18 and 19 of dissimilar materials will cause the distribution of flux to be the same as that produced by the irregular shaped pole pieces shown in Fig. 1.

The armature or cylinder 9 which concentrates the magnetic field may be made, if desired, of materials having different permeabilities and so increase the differential action previously described.

When the contact 12 of the pointer 11 strikes the fixed contacts 13 or 15, according to the increase or decrease of the current through the coil, beyond predetermined limits, a circuit is closed over the conductors 16 which are connected to the respective contacts 13 or 15. The closure of such circuit may operate regulating apparatus to restore the desired voltage or current or to give an alarm.

What is claimed is:

1. A contact making device comprising a fixed member and a rotatable armature member, a pointer associated with the armature member and movable therewith, a coil associated with said armature member, said fixed member comprising pole pieces positioned on either side of said armature member, said pole pieces being so constructed and related to the armature member as to provide a large air gap and a small air gap on each side of the armature in its normal position, the magnetic circuit having a magnetic flux density of mean value when the armature member is in normal position, said magnetic circuit having a comparatively large flux density when said armature member is in one abnormal position, and said magnetic circuit having a comparatively small flux density when said armature member is in another abnormal position, whereby the pointer is accelerated in its movement from a central position in response to a change in the current through said coil.

2. A contact making device comprising a fixed member and a rotatable armature member, a pointer associated with the armature member and movable therewith, contact stops against which the pointer may be moved, a coil associated with said armature member, said fixed member comprising pole pieces positioned on either side of said armature member, said pole pieces being so constructed and related to the armature member as to provide a large air gap and a small air gap on each side of the armature in its normal position, the magnetic circuit having magnetic flux density of mean value when the armature member is in normal position, said magnetic circuit having a comparatively large flux density when said armature member is in one abnormal position, and said magnetic circuit having a comparatively small flux density when said armature is in another abnormal position, whereby the pointer is accelerated in its movement from a central position to a position against one of said contact stops in response to a change in the current through said coil.

3. A contact making device comprising a fixed member and a rotatable armature member, a pointer associated with the armature member and movable therewith, contact stops against which the pointer may be moved, a coil associated with said armature member, said fixed member comprising pole pieces positioned on either side of said armature member, said pole pieces being so constructed and related to the armature member as to present irregular surfaces thereto to provide a large air gap and a small air gap on each side of the armatures in its normal position, the magnetic circuit having a magnetic flux density of mean value when the armature member is in normal position, said magnetic circuit having a comparatively large flux density when said armature is in one abnormal position, and said magnetic circuit having a comparatively small flux density when said armature is in another abnormal position, whereby the pointer is accelerated in its movement from a central position to a position against one of said contact points in response to a change in the current through said coil.

In testimony whereof, I have signed my name to this specification this 1st day of March, 1928.

RALPH K. BONELL.